United States Patent
Ito et al.

(10) Patent No.: US 7,314,425 B2
(45) Date of Patent: Jan. 1, 2008

(54) CONTROL SYSTEM FOR HYBRID VEHICLES

(75) Inventors: Masatoshi Ito, Okazaki (JP); Tatsuya Ozeki, Torrance, CA (US)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 469 days.

(21) Appl. No.: 11/023,503

(22) Filed: Dec. 29, 2004

(65) Prior Publication Data

US 2005/0169765 A1    Aug. 4, 2005

(30) Foreign Application Priority Data

Jan. 22, 2004    (JP)    ............... 2004-014316

(51) Int. Cl.
*B60W 10/02*    (2006.01)

(52) U.S. Cl. ................... 477/5; 903/904; 903/940

(58) Field of Classification Search ............ 477/3, 477/5; 180/65.2, 65.3, 65.4; 903/904, 930, 903/940; 417/1, 20
See application file for complete search history.

(56) References Cited

U.S. PATENT DOCUMENTS

| | | | |
|---|---|---|---|
| 3,623,568 A | 11/1971 | Mori | |
| 5,934,395 A | 8/1999 | Koide et al. | |
| 5,944,632 A | 8/1999 | Hara et al. | |
| 5,967,940 A | 10/1999 | Yamaguchi | |
| 6,253,137 B1 * | 6/2001 | Abo et al. | 701/51 |
| 6,638,022 B2 | 10/2003 | Shimabukuro et al. | |
| 6,647,326 B2 | 11/2003 | Nakamori et al. | |
| 6,692,402 B2 * | 2/2004 | Nakamori et al. | 477/3 |
| 6,709,362 B2 * | 3/2004 | Tomohiro et al. | 477/3 |
| 6,913,558 B2 | 7/2005 | Mori et al. | |
| 6,947,827 B2 | 9/2005 | Fuse et al. | |
| 6,959,238 B2 | 10/2005 | Morishita et al. | |
| 2002/0019691 A1 * | 2/2002 | Matsubara et al. | 701/54 |
| 2003/0064854 A1 | 4/2003 | Kotani | |
| 2003/0078134 A1 | 4/2003 | Kojima et al. | |
| 2003/0171867 A1 | 9/2003 | Nakamori et al. | |
| 2004/0084233 A1 | 5/2004 | Wakuta et al. | |
| 2004/0121882 A1 * | 6/2004 | Tajima et al. | 477/3 |

FOREIGN PATENT DOCUMENTS

| | | |
|---|---|---|
| DE | 197 39 750 A1 | 3/1998 |
| JP | 47-31773 | 8/1972 |

(Continued)

*Primary Examiner*—Roger Pang
(74) *Attorney, Agent, or Firm*—Oblon, Spivak, McClelland, Maier & Neustadt, P.C.

(57) ABSTRACT

A control system for a hybrid vehicle, in which an engine is connected to a first motor generator and to an output shaft through a power distributing mechanism (12), in which a second motor generator is connected to the output shaft through a transmission (6) wherein a torque capacity is varied in accordance with an oil pressure, and which has an electric oil pump (OPM) for generating an oil pressure, comprising: an oil pressure judging means for judging whether or not the oil pressure established by operating OPM is raised higher than a preset value; an electric oil pump output lowering device for lowering an output of OPM in case the oil pressure judging device judges that the oil pressure is raised higher than the preset value; and a cranking device for carrying out a cranking of E/G by the first motor generator.

14 Claims, 6 Drawing Sheets

FOREIGN PATENT DOCUMENTS

| | | |
|---|---|---|
| JP | 8-266012 | 10/1996 |
| JP | 2000046165 A * | 2/2000 |
| JP | 2000-230442 | 8/2000 |
| JP | 2000-308207 | 11/2000 |
| JP | 2001-41067 | 2/2001 |
| JP | 2002-89307 | 3/2002 |
| JP | 2002-115755 | 4/2002 |
| JP | 2002-225578 | 8/2002 |
| JP | 2002-372139 | 12/2002 |

* cited by examiner

FIG.6
(A)
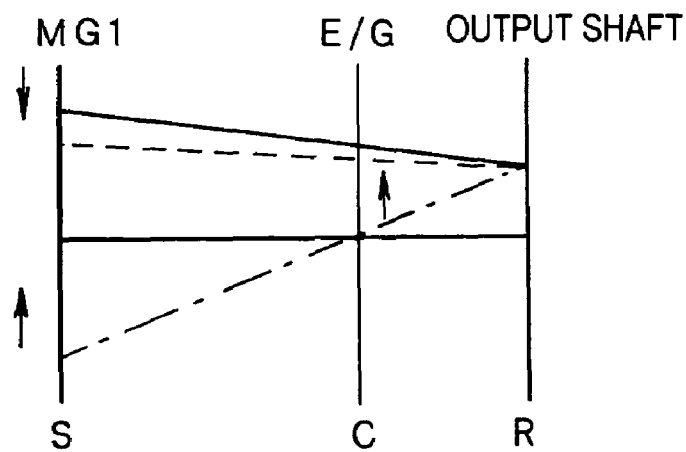
(B)
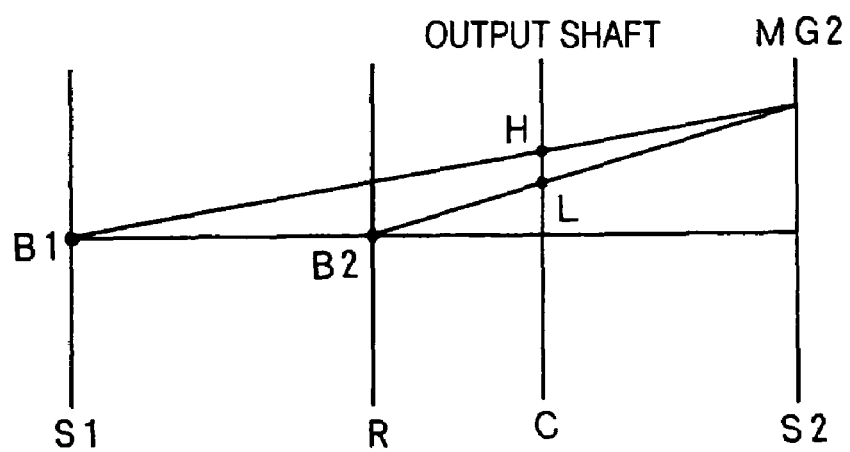

CONTROL SYSTEM FOR HYBRID VEHICLES

BACKGROUND OF THE INVENTION

1. Field of the Invention

This invention relates generally to a control system for a hybrid vehicle provided with a plurality of prime movers for running a vehicle. More particularly, to a control system for a hybrid vehicle, which has an electric oil pump for generating an oil pressure to set a torque capacity of a power transmission system.

The disclosure of Japanese Patent Application No. 2004-14316 filed on Jan. 22, 2004 including specification, drawings and claims is incorporated herein by reference in its entirety.

2. Discussion of the Related Art

One example of the hybrid vehicle equipped with a "mechanical distribution type drive unit" is disclosed in Japanese Patent Laid-Open No. 2002-225578, and a construction thereof will be described briefly hereafter. In the disclosed hybrid vehicle, an engine torque is inputted to a carrier of a single pinion type planetary gear mechanism which constitutes a distributing mechanism, a first motor generator is connected to a sun gear, and an output member such as a counter drive gear etc. is connected to a ring gear. A second motor generator is connected to the output member or the ring gear through a transmission. The transmission is capable of switching a gear stage between a direct gear stage in which the entire transmission rotates integrally, and a low gear stage in which an output speed is lower than an input speed. Those gear stages are set by properly operating an engagement mechanism operated by the oil pressure.

The hybrid vehicle of this kind can be run not only by a motive power of an engine and the first motor generator, but also by using a torque outputted from the second motor generator as an assist torque, or only by an output torque of the second motor generator.

In order to ensure the oil pressure when the engine is halted, in the hybrid vehicle disclosed in Japanese Patent Laid-Open No. 2002-225578, it is conceivable to further provide an electric hydraulic pump which is capable of generating the oil pressure even when the engine is halted, in addition to a hydraulic pump which is driven by the engine. In this hybrid vehicle, moreover, the engine is connected to the first motor generator through a planetary gear mechanism, so that the engine can be started by carrying out a cranking (or a motoring) by the first motor generator. In this case, since an output shaft is connected to the planetary gear mechanism in addition to the engine and the first motor generator, torque acts on the output shaft in the direction to rotate it backward when cranking the engine by the first motor generator. For this reason, a "backward torque", which appears on the output shaft when carrying out a cranking by the first motor generator is countervailed by outputting the torque to the output shaft by the second motor generator. As a result of this, it is possible to prevent a vibration in the vehicle and a backward movement of the vehicle.

On the other hand, the transmission is arranged between the second motor generator and the output shaft. In order to transmit the torque from the second motor generator to the output shaft, therefore, the transmission has to have a predetermined torque capacity. In this case, the engine has not yet been started so that it is impossible to obtain the oil pressure from the oil pump driven by the engine. Accordingly, it is necessary to generate the oil pressure by operating an electric oil pump provided in addition to the oil pump driven by the engine. As a result of this, both the first motor generator for starting the engine and the electric oil pump are driven at a starting time of the engine. If both of those first motor generator and electric oil pump are driven simultaneously, a load on an accumulator device such as a battery increases. This results in a shortage of electric power supply to the first motor generator or the like. Consequently, a cranking torque becomes insufficient so that it may take long time to startup the engine.

SUMMARY OF THE INVENTION

An object of this invention is to prevent a delay in startup of a hybrid vehicle comprising a plurality of prime movers including an internal combustion engine, and an electric oil pump for generating an oil pressure to set a torque capacity of a transmission.

In order to achieve the aforementioned object, according to the present invention, there is provided a control system for a hybrid vehicle, characterized in that: an electric motor for rotating the internal combustion engine to start, and the electric oil pump for generating an oil pressure to set a torque capacity of the transmission, are controlled correlatively to each other. More specifically, according to the present invention, there is provided a control system for a hybrid vehicle, in which an internal combustion engine is connected to a first electric motor and to an output member through a power distributing mechanism, in which a second electric motor is connected to the output member through a transmission wherein a torque capacity is varied in accordance with an oil pressure, and which has an electric oil pump for generating an oil pressure to set the torque capacity of the transmission, comprising: an oil pressure judging means for judging whether or not the oil pressure established by operating the electric oil pump is raised higher than a preset value; an electric oil pump output lowering means for lowering an output of the electric oil pump in case the oil pressure judging means judges that the oil pressure is raised higher than the preset value; and a cranking means for carrying out a cranking of the internal combustion engine by the first electric motor.

According to the present invention, therefore, the output of the electric oil pump is lowered, and the first electric motor carries out the cranking of the internal combustion engine, in case the oil pressure generated by the electric oil pump is raised higher than the preset value. Accordingly, it is possible to avoid a situation where the electric oil pump and the first electric motor are driven simultaneously to the high output, so that the cranking of the internal combustion engine can be executed by feeding sufficient electric power to the first electric motor. Consequently, a prompt startup of the internal combustion engine can be achieved.

In addition to the above-mentioned construction, a control system for a hybrid vehicle of the present invention further comprises: a second electric motor control means for carrying out a constant-speed control to keep the speed of the second electric motor at constant speed in the process of raising the oil pressure by operating the electric oil pump; and characterized in that the oil pressure judging means includes a means for determining the oil pressure on the basis of the change in the speed of the second electric motor which is controlled to the constant speed.

With this construction, the torque capacity of the transmission is increased in accordance with a rise in the oil pressure, and on the other hand, the output member is fixed. Therefore, the speed of the second electric motor controlled to the constant speed is varied in accordance with the rise in the oil pressure, and this speed change is detected to judge the rise in the oil pressure. Consequently, the rise in the oil pressure established by the electric oil pump can be detected on the basis of the change in the speed of existing second motor generator, without providing new equipment such as an oil pressure sensor.

In addition, a complete combustion of the internal combustion engine can be determined on the basis of a current value or speed of the first electric motor.

According to the invention, moreover, the oil pressure judging means can includes a means for judging whether or not a preset time period, in which the oil pressure resulting from the operation of electric oil pump does not exceed a preset value, has been elapsed; the electric oil pump output lowering means can include a means for lowering the output of the electric oil pump in case a lapse of the preset time period is judged; and the cranking means can include a means for carrying out the cranking of the internal combustion engine by the first electric motor after the lapse of the preset time is judged by the oil pressure judging means.

With this construction, therefore, the output of the electric oil pump is lowered and the cranking of the internal combustion engine is carried out by the first electric motor, in case the preset time period, in which the oil pressure resulting from the operation of the electric oil pump does not exceed a preset value, has been elapsed. Accordingly, it is possible to avoid a situation where the electric oil pump and the first electric motor are driven simultaneously to the high output, and it is also possible to avoid a situation where the electric oil pump is kept driving excessively so that the electric power is highly consumed.

According to the invention, furthermore, it is possible to provide a fixing mechanism for fixing the output member at the startup of the internal combustion engine. Providing the fixing mechanism prevents a particular change of a behavior of the vehicle, even in case the internal combustion engine is started before the oil pressure of the electric oil pump is raised sufficiently.

The above and further objects and novel features of the invention will more fully appear from the following detailed description when the same is read with reference to the accompanying drawings. It is to be expressly understood, however, that the drawings are for purpose of illustration only and are not intended as a definition of the limits of the invention.

BRIEF DESCRIPTION OF THE DRAWINGS

FIG. 6 is a nomographic diagram on the drive unit to which the invention is applied.

DETAILED DESCRIPTION OF THE PREFERRED EMBODIMENT

Figure 3:
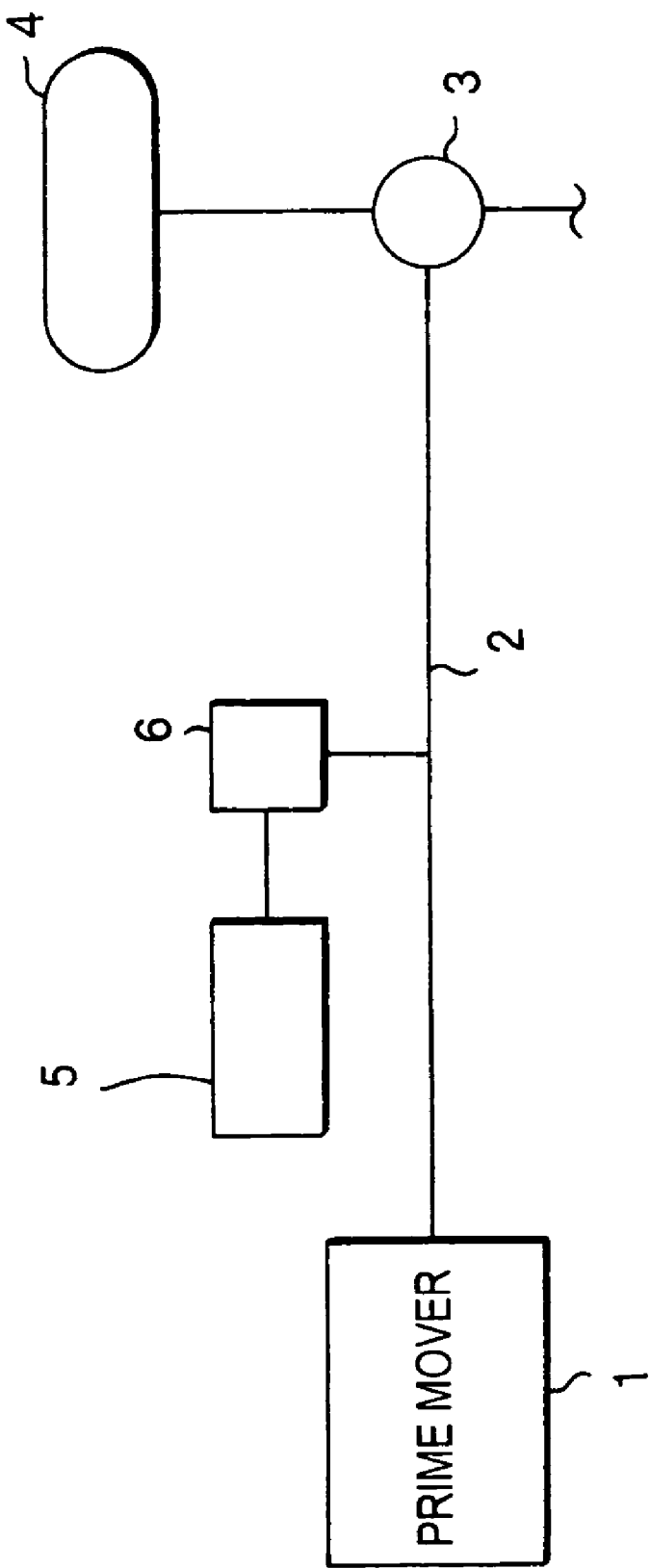
FIG. 3 is a diagram schematically showing a drive unit of a vehicle to which the invention is applied.

This invention will be described in connection with its specific examples. The first description is made on a drive unit of a hybrid vehicle, to which is this invention is applied. In the hybrid drive unit or an application target of this invention, as shown in FIG. 3, the torque of a main prime mover 1 (i.e., a first prime mover) is transmitted to an output member 2, from which the torque is transmitted through a differential 3 to drive wheels 4. On the other hand, there is provided an assist prime mover (i.e., a second prime mover) 5, which can make a power control to output a driving force for a drive and a regenerative control to recover an energy. This assist prime mover 5 is connected through a transmission 6 to the output member 2. Between the assist prime mover 5 and the output member 2, therefore, the transmission torque capacity is increased/decreased according to a gear ratio to be set by the transmission 6.

This transmission 6 can be constructed to set the gear ratio at "1" or higher. With this construction, at the power running time for the assist prime mover 5 to output the torque, this torque can be outputted to the output member 2 so that the assist prime mover 5 can be made to have a low capacity or a small size. However, it is preferred that the running efficiency of the assist prime mover 5 is kept in a satisfactory state. In case the speed of the output member 2 rises according to the vehicle speed, for example, the gear ratio is lowered to decrease the speed of the assist prime mover 5. In case the speed of the output member 2 drops, on the other hand, the gear ratio may be raised.

Figure 4:
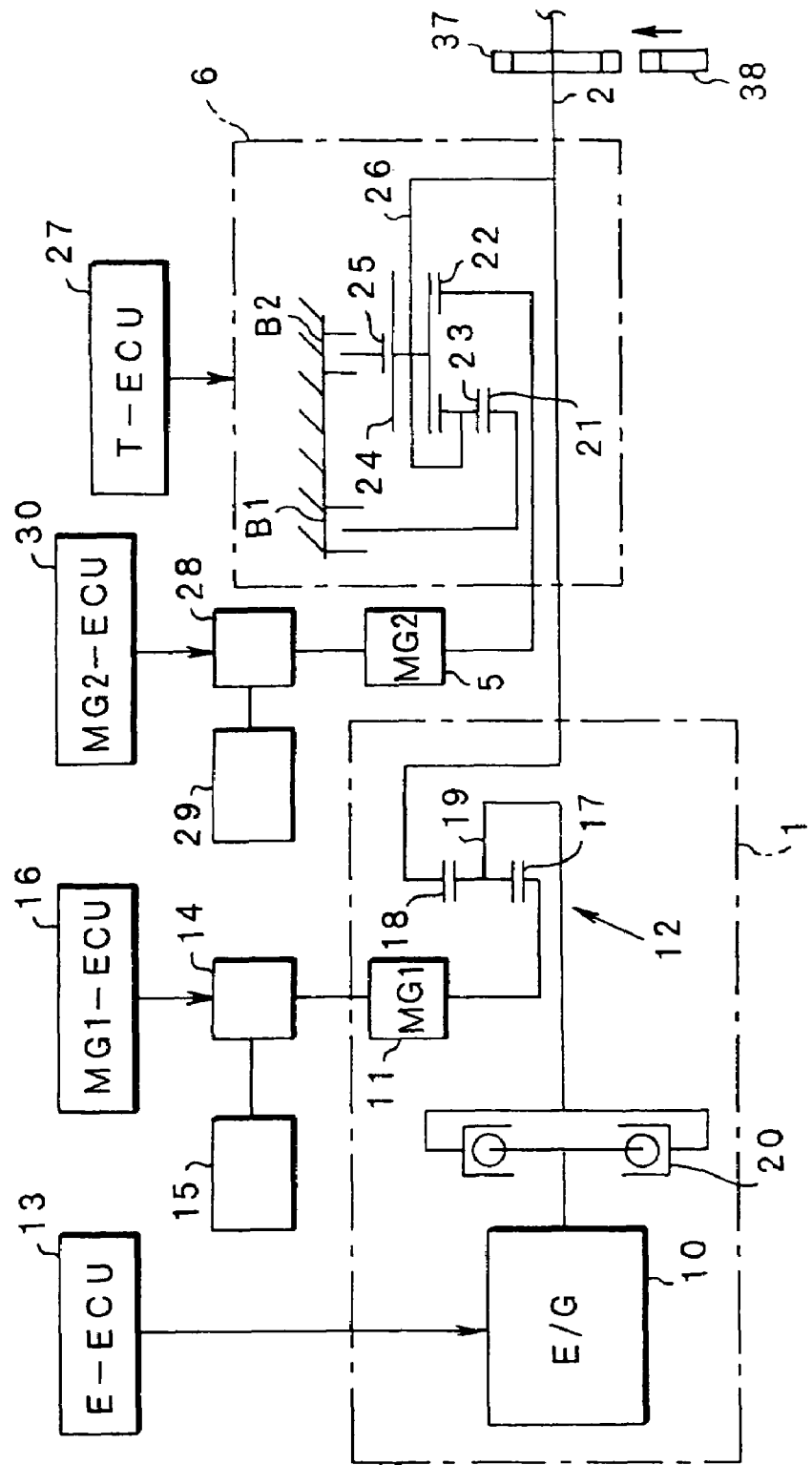
FIG. 4 is a diagram showing a drive unit of a vehicle to which the invention is applied.

The aforementioned hybrid drive unit will be described more specifically. As shown in FIG. 4, the main prime mover 1 is mainly constructed to include an internal combustion engine 10 (as will be called the "engine"), a motor generator (as will be tentatively called the "first motor generator" or "MG 1") 11, and a planetary gear mechanism 12 for synthesizing or distributing the torque between those internal combustion engine 10 and first motor generator 11. The engine 10 is a well-known power unit such as a gasoline engine or a diesel engine for outputting a power by burning a fuel, and is so constructed that its running state such as the degree of throttle opening (or the air intake amount), the fuel feed amount or the ignition timing can be electrically controlled. This control is made by an electronic control unit (E-ECU) 13 composed mainly of a microcomputer, for example.

On the other hand, the first motor generator 11 is exemplified by a permanent magnet type synchronous electric motor and is constructed to function as an electric motor and a dynamo. The first motor generator 11 is connected through an inverter 14 with an accumulator device 15 such as a battery. By controlling the inverter 14, moreover, the output torque or the regenerative torque of the first motor generator 11 is suitably set. For this control, there is provided an electronic control unit (MG1-ECU) 16, which is composed mainly of a microcomputer. Here, a stator (a stator not shown) of the first motor generator 11 is so fixed as not to rotate.

Moreover, the planetary gear mechanism 12 is a well-known one for establishing a differential action with three rotary elements: a sun gear 17 or an external gear; a ring gear 18 or an internal gear arranged concentrically with the sun gear 17; and a carrier 19 holding a pinion gear meshing with those sun gear 17 and ring gear 18 such that the pinion gear may rotate on its axis and revolve around the carrier 19. The engine 10 has its output shaft connected through a damper 20 to that carrier 19 as a first rotary element. In other words, the carrier 19 acts as an input element.

On the other hand, a rotor (rotor not shown) of the first motor generator 11 is connected to the sun gear 17 as a second rotary element. Therefore, this sun gear 17 is the so-called "reaction element", and the ring gear 18 as a third rotary element is the output element. And, this ring gear 18 is connected to the output member (i.e., the output shaft) 2.

In the example shown in FIG. 4, on the other hand, the transmission 6 is constructed of one set of Ravignaux type planetary gear mechanisms. The planetary gear mechanism is provided with external gears, i.e., a first sun gear (S1) 21 and a second sun gear (S2), of which the first sun gear 21 meshes with a first pinion 23, which meshes with a second pinion 24, which meshes with a ring gear (R) 25 arranged concentrically with the individual sun gears 21 and 22. Here, the individual pinions 23 and 24 are so held by a carrier (C) 26 as to rotate on their axes and to revolve around the carrier 26. Moreover, the second sun gear 22 meshes with the second pinion 24. Thus, the first sun gear 21 and the ring gear 25 construct a mechanism corresponding to a double-pinion type planetary gear mechanism together with the individual pinions 23 and 24, and the second sun gear 22 and the ring gear 25 construct a mechanism corresponding to a single pinion type planetary gear mechanism together with the second pinion 24.

There are also provided a first brake B1 for fixing the first sun gear 21 selectively, and a second brake B2 for fixing the ring gear 25 selectively. These brakes B1 and B2 are the so-called "frictional engagement devices" for establishing engaging forces by frictional forces, and can adopt a multi-disc engagement device or a band type engagement device. The brakes B1 and B2 are constructed to change their torque capacities continuously according to the engaging forces of oil pressures. Moreover, the aforementioned assist prime mover 5 is connected to the second sun gear 22, and the carrier 26 is connected to the output shaft 2. Furthermore, a parking gear 37 for putting the vehicle into a parking state is installed on the output shaft 2. Also, there is provided a parking lock pawl 38 for halting a rotation of the parking gear 37 by engaging therewith, in case a parking position is selected by a not shown shifting device.

In the transmission 6 thus far described, therefore, the second sun gear 22 is the so-called "input element", and the carrier 26 is the output element. The transmission 6 is constructed to set high gear stages of gear ratios higher than "1" by applying the first brake B1, and to set low gear stages of gear ratios higher than those of the high gear stages by applying the second brake B2 in place of the first brake B1. The shifting operations between those individual gear stages are executed on the basis of a running state such as a vehicle speed or a drive demand (or the degree of accelerator opening). More specifically, the shifting operations are controlled by predetermining gear stage regions as a map (or a shifting diagram) and by setting any of the gear stages according to the detected running state. For these controls, there is provided an electronic control unit (T-ECU) 27, which is composed mainly of a microcomputer.

Here in the example shown in FIG. 4, there is adopted a motor generator (as will be tentatively called the "second motor generator" or "MG2") as the assist prime mover 5, which can have the power mode to output the torque and the regenerative mode to recover the energy. This second motor generator 5 is exemplified by a permanent magnet type synchronous electric motor and its rotor (rotor not shown) is connected to the second sun gear 22. Also, the second motor generator 5 is connected through an inverter 28 with a battery 29. Moreover, the motor generator 5 is constructed to control the power mode, the regenerative mode and the torques in the individual modes by controlling the inverter 28 with an electronic control unit (MG2-ECU) 30 composed mainly of a microcomputer. Here, the battery 29 and the electronic control unit 30 can also be integrated with the inverter 14 and the battery (the accumulator device) 15 for the aforementioned first motor generator 11. Additionally, a stator (a stator not shown) of the second motor generator 5 is so fixed as not to rotate.

A nomographic diagram of the single pinion type planetary gear mechanism 12 as the aforementioned torque synthesizing/distributing mechanism is present at (A) in FIG. 6. When the reaction torque by the first motor generator 11 is inputted to the sun gear (S) 17 against the torque to be inputted to the carrier (C) 19 and outputted by the engine 10, a torque in the magnitude derived from an addition or subtraction of those torque appears at the ring gear (R) 18 acting as the output element. In this case, the rotor of the first motor generator 11 is rotated by this torque, and the first motor generator 11 functions as a dynamo. With the speed (or the output speed) of the ring gear 18 being constant, on the other hand, the speed of the engine 10 can be continuously (or without any step) changed by increasing/decreasing the speed of the first motor generator 11. Specifically, the control for setting the speed of the engine 10 at a value for the best fuel economy can be made by controlling the first motor generator 11.

As indicated by a chain line in FIG. 6(A), moreover, the first motor generator 11 rotates backward when the engine 10 is halted while the vehicle is running. In this state, if the torque is outputted in a forward direction by operating the first motor generator 11 as the electric motor, the torque acts on the engine 10 connected to the carrier 19 to rotate it in the forward direction. As a result, the engine 10 can be started (i.e., motored or cranked) by the first motor generator 11. In this case, the torque acts on the output shaft 2 in the direction to stop the rotation of the output shaft 2. Therefore, the driving torque for running can be maintained by controlling the torque outputted from the second motor generator 5, and at the same time, the startup of the engine 10 can be executed smoothly. Here, the hybrid type of this kind is called "mechanical distribution type" or "split type".

On the other hand, a nomographic diagram of the Ravignaux type planetary gear mechanism constructing the transmission 6 is presented at (B) in FIG. 6. When the ring gear 25 is fixed by the second brake B2, a low gear stage L is set so that the torque outputted from the second motor generator 5 is amplified according to the gear ratio and applied to the output shaft 2. When the first sun gear 21 is fixed by the first brake B1, on the other hand, there is set a high gear stage H having a lower gear ratio than that of the low gear stage L. The gear ratio at this high gear stage is higher than "1" so that the torque outputted by the second motor generator 5 is augmented according to that gear ratio and applied to the output shaft 2.

Here, in the state where the individual gear stages L and H are steadily set, the torque to be applied to the output shaft 2 is such one as is augmented from the output torque of the second motor generator 5 according to the gear ratio. In the shifting transitional state, however, the torque is such one as is influenced by the torque capacities at the individual brakes B1 and B2 and by the inertia torque accompanying the speed change. On the other hand, the torque to be applied to the output shaft 2 is positive in the drive state of the second motor generator 5 but negative in the driven state.

Figure 5:
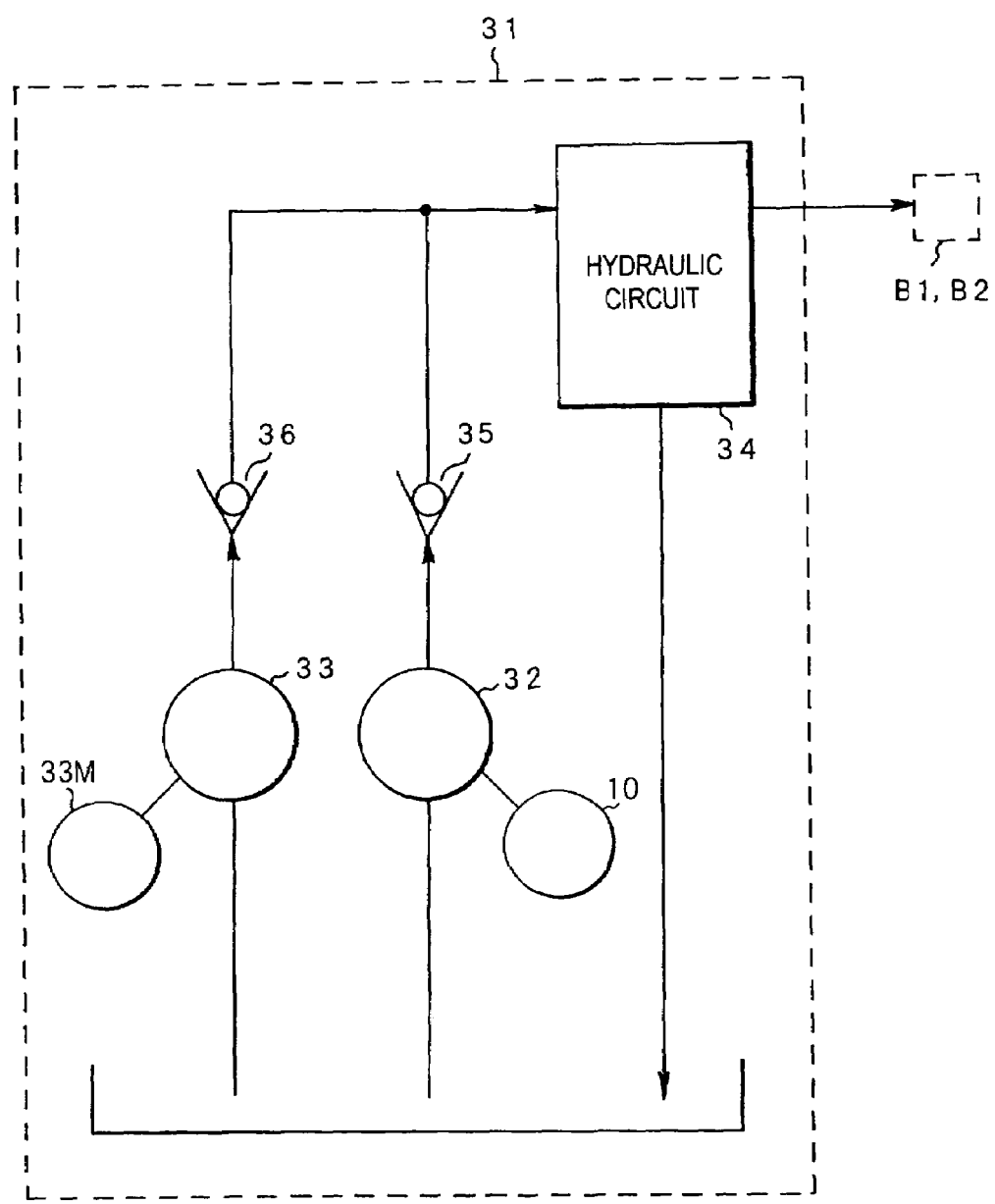
FIG. 5 is a diagram showing a hydraulic control circuit to which the invention is applied.

There is provided a hydraulic control system 31 for controlling the engagement/release of the aforementioned individual brakes B1 and B2 by feeding/discharging the oil pressure thereto/therefrom. As shown in FIG. 5, the hydraulic control system 31 comprises a mechanical oil pump 32, an electric oil pump 33, and a hydraulic circuit 34. The hydraulic circuit 34 is constructed to regulate an oil pressure established by those oil pumps 32 and 33 to a line pressure, to feed and discharge the oil pressure regulated from the line pressure as an initial pressure to/from the brakes B1 and B2, and to feed a lubrication oil to requiring portions. The mechanical oil pump 32 is driven by the engine 10 to generate the oil pressure, and is arranged e.g., in an output side of the damper 20 and coaxially therewith. The mechanical oil pump 32 is operated by the torque of the engine 10. On the other hand, the electric oil pump 33 is driven by a motor 33M, and is arranged at a suitable place such as an outside of a casing (casing not shown). The electric oil pump 33 is operated by an electric power from an electric accumulator such as a battery to generate oil pressure.

The hydraulic circuit 34 comprises a plurality of solenoid valves, change-over valves or pressure regulator valves (those are not shown), and the regulation and the feeding/discharging of the oil pressure can be controlled electrically. Here, there are provided check valves 35 and 36 on a discharging side of the individual oil pumps 32 and 33. Those check valves 35 and 36 are opened by a discharging pressure of those oil pumps 32 and 33, and closed in an opposite direction. The oil pumps 32 and 33 are connected to the hydraulic circuit 34 and those pumps are arranged in parallel with each other. In addition, a valve for regulating the line pressure (valve not shown) controls the line pressure into two stages, such as a high pressure stage by increasing the discharging amount, and a low pressure stage by decreasing the discharging amount.

The aforementioned hybrid drive unit comprises two prime movers such as the main prime mover 1 and the assist prime mover 5. The vehicle runs at low fuel consumption and at low emission by making good use of those prime movers. Even in case of driving the engine 10, moreover, the speed of the engine 10 is controlled at the optimum fuel consumption by the first motor generator 11. Moreover, inertia energy of the vehicle is regenerated as electric power at the coasting time. In case the torque is assisted by driving the second motor generator 5, the torque to be added to the output shaft 2 is augmented by setting the transmission 6 at the low gear stage L when the vehicle speed is low. On the other hand, the speed of the second motor generator 5 is relatively lowered to reduce the loss by setting the transmission 6 at the high gear stage H when the vehicle speed is raised. Thus, the torque assist is carried out efficiently.

The aforementioned hybrid vehicle is capable of running by the power of the engine 10, by both of the engine 10 and the second motor generator 5, and only by the second motor generator 5. Those running pattern is determined and selected on the basis of drive demands represented by the accelerator opening, vehicle speed, and so on. For example, in case the battery charge is sufficient and the drive demand is relatively small, or in case a quiet start is selected by a manual operation, the running pattern is selected which is similar to that of an electric vehicle (as will be tentatively called "EV running") using the second motor generator 5, and the engine 10 is halted. In this state, in case the drive demand is increased when e.g., the accelerator pedal is depressed deeply, in case the battery charge is decreased, or in case the running state is shifted from the quiet start to a normal running by a manual operation, the engine 10 is started and the running pattern is shifted to the running pattern using the engine 10 (as will be tentatively called "E/G running").

In the aforementioned example, a startup of the engine 10 is carried out by the first motor generator 11 functioning as the motor, and by transmitting the torque to the engine 10 through the planetary gear mechanism 12 so as to carry out the motoring (or the cranking). In this case, if the torque is applied to the sun gear 17 by the first motor generator 11 in the direction to rotate the sun gear 17 forward, the torque acts on the ring gear 18 in the direction to rotate the ring gear 18 backward. Since the ring gear 18 is connected to the output shaft 2, the torque involved in the startup of the engine 10 acts in the direction to reduce the vehicle speed. At the startup of the engine 10, therefore, the torque is outputted from the second motor generator 5 in order to countervail a "reaction torque".

In case of starting the vehicle from a state where a ignition switch is not turned to a starting position, a start control is carried out to feed the oil pressure by operating the electric oil pump 33. However, since the cranking of the engine 10 is carried out by the first motor generator 11, execution of the cranking is a load on the accumulator device such as the battery.

Since electric power is not generated by the motor generators 5 and 11 when the start control is carried out, so that the operation of the electric oil pump 33 is also a load on the accumulator device such as the battery. Therefore, in order to avoid a reduction in the respective outputs resulting from a competition for the electric power of the accumulator device such as the battery, between the applications such as the cranking of the engine 10 by the first motor generator 11 and operation of the electric oil pump 33, the control system of the invention carries out the following controls.

Figure 1:
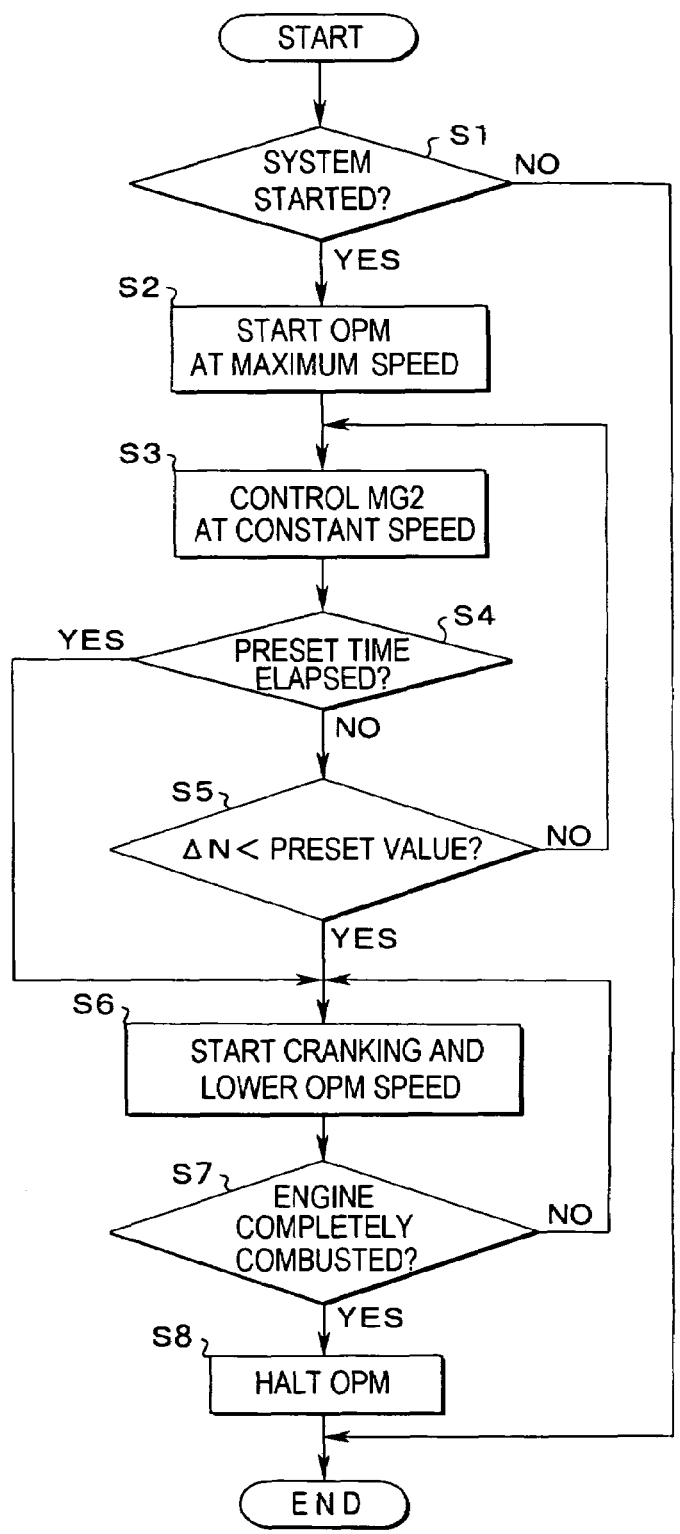
FIG. 1 is a flow chart for explaining a control example by a control system of this invention.

FIG. 1 is a flowchart for explaining an example of the control. First of all, it is judged (at Step S1) whether or not the system is started up. Specifically, it is judged whether or not a start switch of the entire vehicle, e.g., the ignition switch is turned to the starting position. In case the answer of Step S1 is NO, the routine is ended.

In case the answer of Step S1 is YES, the electric oil pump (OPM) 33 is started and the output thereof is raised immediately to maximum (at Step S2). Here, the start switch of the entire vehicle is turned ON only in the case where a sift position is in a parking position (P) or in a neutral position (N). In case of starting the engine 10 when the sift position is in a parking position, the parking lock pawl 38 engages with the parking gear 37 and the output shaft 2 is thereby fixed.

On the other hand, the second motor generator 5 is not directly involved in the startup of the engine 10, if the torque capacity of the transmission 6 is insufficient. However, a constant-speed control to raise the speed of the second motor generator 5 and keep it at constant speed is carried out (at Step S3). The second brake B2 is engaged gradually as the oil pressure rises, and a negative torque acting on the second motor generator 5 is consequently increased so that the speed of the second motor generator 5 is lowered. Therefore, the rise in the oil pressure can be detected from a change in the speed of the second motor generator 5. This is a reason for raising the speed of the second motor generator 5 in advance.

Then, it is judged (at Step S4) whether or not a preset time has elapsed from the instant when the electric oil pump 33 has been started. This preset time is set in advance as a time period until the oil pressure generated by starting the electric oil pump 33 reaches the oil pressure capable of setting a sufficient torque capacity of the transmission 6. In the beginning of the start control, sufficient time has not elapsed yet so that the answer of Step S4 is NO. In this case, a determination of engagement of the brake B2 is made subsequently (at Step S5). The engagement of the brake B2 can be determined from the fact that a speed deference $\Delta N$ between the speeds of the brake B2 and that of another rotary member (e.g., the output shaft 2) becomes smaller than a preset value, or the fact that the speed of the second motor generator 5 becomes smaller than a preset value.

The oil pressure still has not risen just after the startup of the electric oil pump 33. Therefore, no changes come about in the speed of the second motor generator 5 so that the answer of Step S5 is NO. In this case, the routine is returned so as to continue the preceding control. On the contrary, when the oil pressure rises to a certain level, changes come about in the speeds of the brake B2 and the second motor generator 5 so that answer of Step S5 is YES. Specifically, it is determined that the oil pressure established by operating the electric oil pump 33 is raised higher than the preset value, on the basis of the change in the speed.

In case the answer of Step S5 is YES, the speed of the electric oil pump (OPM) 33 is lowered. That is, the output of the electric oil pump 33 is lowered. Also, the cranking of the engine 10 is carried out by operating the first motor generator 11 as a motor (at Step S6). Accordingly, the output of the electric oil pump 33 is lowered at the instant when the first motor generator 11 is operated as a motor by supplying electric power thereto, therefore, the electric power is ensured sufficiently. As a result, the cranking of the engine 10 can be carried out certainly by the first motor generator 11 so that the engine 10 can be started promptly.

The complete combustion of the engine 10 is determined while the cranking of the engine 10 is thus being carried out (at Step S7). Specifically, it is judged whether or not the engine 10 starts rotating autonomously. When the engine 10 rotates autonomously, a negative torque of the first motor generator 11 is lowered and turned into a positive torque, so that a current value and speed of the first motor generator 11 are changed. Therefore, the determination at Step S7 can be made on the basis of the current value and speed of the first motor generator 11.

In case the answer of Step S7 is NO, the routine is returned to Step S6 so as to continue the cranking by the first motor generator 11. On the contrary, in case the engine 10 is in a complete combustion condition so that the answer of Step S7 is YES, the electric oil pump 33 is halted (at Step S8). This is because the mechanical oil pump 32 is driven by the engine 10 and generates the oil pressure sufficiently when the startup of the engine is completed.

After the electric oil pump 33 is started, the preset time has elapsed without any affirmative judgment at step S5 so that the answer of the Step S4 is YES, the routine advances to Step S6 immediately and an output lowering control for the electric oil pump 33 and the cranking of the engine 10 are carried out. Specifically, in case the affirmative judgment has not been made at Step S5 within the preset time period after the electric oil pump 33 is started, it is presumed that the oil pressure would not be raised sufficiently due to some sort of troubles. Therefore, if the electric oil pump 33 is driven longer than the preset time period, the electric power may be consumed excessively. For this reason, the electric oil pump 33 is not driven longer than the preset time period. In this case, the transmission 6 does not have enough torque capacity so that the torque of the second motor generator 5 cannot be transmitted to the output shaft 2. Specifically, the torque which acts on the output shaft 2 as a result of the cranking of the second motor generator 5 cannot be canceled sufficiently by the torque of the second motor generator 5. However, since the output shaft 2 is fixed by the aforementioned parking gear 37 and the parking lock pawl 38, it is possible to receive a reaction force at the cranking time of the engine 10 by the parking gear 37 and the parking lock pawl 38. Consequently, the vehicle will not be moved backward.

Figure 2:
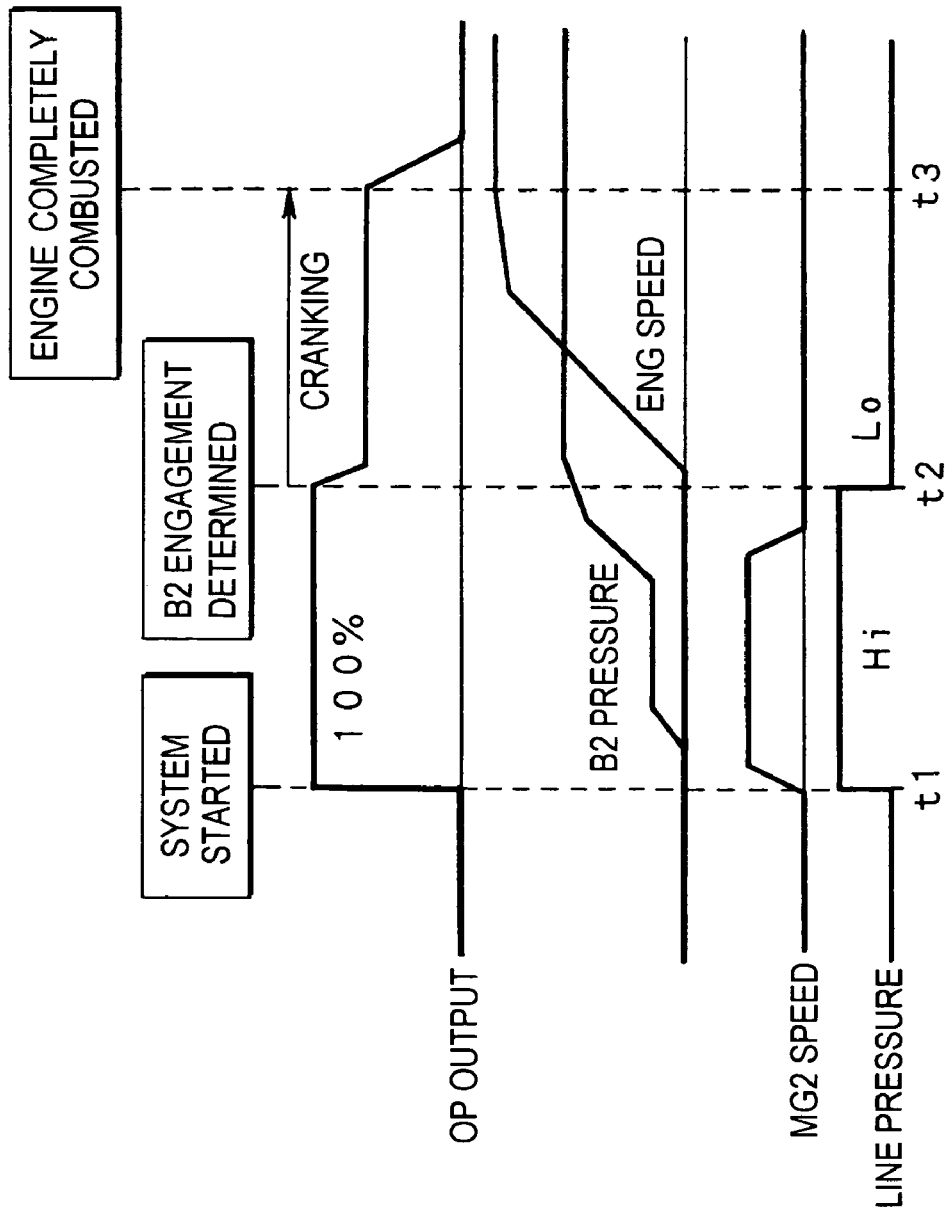
FIG. 2 is a time chart for explaining a control example by a control system of this invention.

Next, here will be described a temporal course of this example with reference to a time chart of FIG. 2. When the start switch of the entire vehicle, e.g., the ignition switch is turned to the starting position and the start control is commenced (at a point of time t1, corresponding to Step S1), the electric oil pump 33 is started immediately and controlled to maximum output. Accordingly, the oil pressure generated by the electric oil pump 33 rises with a time delay (from the point of time t1 to a point of time t2, corresponding to Steps S2 to S4), and an engaging pressure of the brake B2 also rises.

Here, in this process, the second motor generator 5 is subjected to the constant-speed control. Also, a control level of the line pressure is set to a high state H1 in order to raise the line pressure promptly.

When the oil pressure outputted by the electric oil pump 33 rises gradually and the brake B2 is engaged gradually (i.e., when the torque capacity of the transmission 6 is increased gradually), the speed of the second motor generator 5 is lowered gradually and stopped at the end because the rotation of the output shaft 2 is halted. The rise in the oil pressure is judged on the basis of the change in the speed of the second motor generator 5 (at the time point t2, corresponding to Step S5). Then, the speed of the electric oil pump 33 is lowered and the cranking of the engine 10 is commenced (from the point of time t2 to a point of time t3, corresponding to Step S6). The speed of the engine 10 increases as a commencement of the cranking (from the point of time t2 to the point of time t3). When the engine 10 completely starts rotating autonomously (at the time point t3, corresponding to Step S7), the rotation of the electric oil pump 33 is halted (at the time point t3, corresponds to Step S8). Feeding of the oil pressure is carried out by the mechanical oil pump 32 from then on (after the point of time t3). Additionally, the control level of the line pressure is set to a low state Lo when the cranking of the engine 10 is commenced.

Accordingly, in case the oil pressure generated by the electric oil pump 33 exceeds the preset value, the output of the electric oil pump 33 is lowered and then the cranking of the engine 10 is carried out by the first motor generator 11. Therefore, the electric power corresponds to a lowered amount of the output of the electric oil pump 33 can be used for the cranking of the engine 10. As a result, the cranking time can be saved.

Moreover, the oil pressure is judged to excess the preset value at the instant when the change comes to the speed of the second motor generator 5 which is subjected to the constant-speed control. Accordingly, the rise in the oil pressure can be detected or judged on the basis of the change in the speed of existing second motor generator 5.

Furthermore, if the preset time, in which the oil pressure does not exceed the preset value, has elapsed after the electric oil pump 33 is started, the output of the electric oil pump 33 is lowered by controlling the electric oil pump 33 to the non-operating side, and the cranking of the engine 10 is commenced. Therefore, it is possible to avoid an excessive consumption of the electric power and to start the engine 10, even if there is some malfunction such as a failure in the electric oil pump 33.

Here will be briefly described the relations between the aforementioned specific examples and this invention. The functional means of Step S5 or the electronic control unit for providing the same function corresponds to "the oil pressure judging means" of the invention; the functional means of Step S6 or the electronic control unit for providing the same function corresponds to "the electric oil pump output lowering means" of the invention; and the functional means of Step S6 or the electronic control unit for providing the same function corresponds to "the cranking means" of the invention. Also, the functional means of Step S3 or the electronic control unit for providing the same function corresponds to "the second electric motor control means" of the invention.

On the other hand, the first motor generator 11 corresponds to "the first electric motor" of the invention, and the second motor generator 5 corresponds to "the second electric motor" of the invention.

What is claimed is:

1. A control system for a hybrid vehicle, in which an internal combustion engine is connected to a first electric motor and to an output member through a power distributing mechanism, in which a second electric motor is connected to the output member through a transmission wherein a torque capacity is varied in accordance with an oil pressure, and which has an electric oil pump for generating an oil pressure to set the torque capacity of the transmission, comprising:
    an oil pressure judging means for judging whether or not the oil pressure established by operating the electric oil pump is raised higher than a preset value;
    an electric oil pump output lowering means for lowering an output of the electric oil pump in case the oil pressure judging means judges that the oil pressure is raised higher than the preset value; and
    a cranking means for carrying out a cranking of the internal combustion engine by the first electric motor.

2. The control system for a hybrid vehicle according to claim 1, comprising:
    a second electric motor control means for carrying out a constant-speed control to keep the speed of the second electric motor at constant speed in the process of raising the oil pressure by operating the electric oil pump; and
    wherein the oil pressure judging means includes a means for judging the oil pressure on the basis of the change in the speed of the second electric motor which is subjected to the constant-speed control.

3. The control system for a hybrid vehicle according to claim 1, further comprising:
    a complete combustion determining means for determining a complete combustion of the internal combustion engine on the basis of a current value or speed of the first electric motor,
    wherein the oil pump output lowering means includes means for halting an operation of the electric oil pump in case the complete combustion determining means determines that the internal combustion engine is in a complete combustion condition.

4. The control system for a hybrid vehicle according to claim 1,
    wherein the oil pressure judging means includes a means for judging whether or not a preset time period, in which the oil pressure resulting from the operation of electric oil pump does not exceed a preset value, has been elapsed;
    wherein the electric oil pump output lowering means includes a means for lowering the output of the electric oil pump in case a lapse of the preset time period is judged, and
    wherein the cranking means includes a means for cranking the internal combustion engine by the first electric motor after the lapse of the preset time is judged by the oil pressure judging means.

5. The control system for a hybrid vehicle according to claim 4, further comprising:
    a fixing mechanism for halting a rotation of the output member; and
    wherein the cranking means includes a means for carrying out the cranking of the internal combustion engine when the rotation of the output member is halted by the fixing mechanism.

6. The control system for a hybrid vehicle according to claim 5, wherein the fixing mechanism includes:
    a parking gear which is installed on the output member, and
    a parking lock pawl for halting a rotation of the output member by engaging with the parking gear when it is shifted to a parking range.

7. The control system for a hybrid vehicle according to claim 1, further comprising:
    a line pressure control means for switching a line pressure as an initial pressure of an oil pressure to be fed to the transmission, from a predetermined low pressure to a high pressure higher than the low pressure when startup the internal combustion engine while the electric oil pump is generating the oil pressure, and for bringing the line pressure from the high pressure back to the low pressure after commencement of the startup of the internal combustion engine.

8. The control system for a hybrid vehicle according to claim 1,
    wherein the power distributing mechanism includes a gear mechanism for performing a differential action to distribute an output torque of the internal combustion engine to the first electric motor and the output member.

9. The control system for a hybrid vehicle according to claim 8, further comprising:
    a fixing mechanism for halting a rotation of the output member, in case of cranking the internal combustion engine by the first electric motor.

10. The control system for a hybrid vehicle according to claim 8,
    wherein the gear mechanism includes a planetary gear mechanism, comprising;
    an input element to which the torque of the internal combustion engine is inputted,
    a reaction element to which the first motor generator is connected, and
    an output element to which the output member is connected.

11. The control system for a hybrid vehicle according to claim 8,
    wherein the gear mechanism includes a single pinion type planetary gear mechanism, comprising;
    a carrier to which the torque of the internal combustion engine is inputted,
    a sun gear to which the first motor generator is connected, and a ring gear to which the output member is connected.

12. The control system for a hybrid vehicle according to claim 1,
    wherein the transmission includes a mechanism capable of switching a gear ratio at least between high and low.

13. The control system for a hybrid vehicle according to claim 12,
wherein the mechanism includes a Ravigneaux type planetary gear mechanism.

14. The control system for a hybrid vehicle according to claim 1,
wherein the transmission comprises:
a first sun gear which is fixed selectively,
a ring gear which is arranged concentrically with the first sun gear,
a first pinion gear which meshes with the first sun gear,
a second pinion gear which meshes with the first pinion gear and the ring gear,
a carrier which holds those pinion gears, and which is connected to the output member, and
a second sun gear which meshes with the second pinion gear, and to which the second electric motor is connected.

* * * * *